(12) United States Patent
Hedberg et al.

(10) Patent No.: US 9,986,498 B2
(45) Date of Patent: May 29, 2018

(54) NODE ARRANGEMENT AND A METHOD THEREIN

(71) Applicant: TELEFONAKTIEBOLAGET L M ERICSSON (PUBL), Stockholm (SE)

(72) Inventors: Tomas Hedberg, Stockholm (SE); Filip Mestanov, Sollentuna (SE); Jari Vikberg, Jarna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 273 days.

(21) Appl. No.: 14/781,390

(22) PCT Filed: Mar. 26, 2014

(86) PCT No.: PCT/SE2014/050364
§ 371 (c)(1),
(2) Date: Sep. 30, 2015

(87) PCT Pub. No.: WO2014/168551
PCT Pub. Date: Oct. 16, 2014

(65) Prior Publication Data
US 2016/0066239 A1    Mar. 3, 2016

Related U.S. Application Data

(60) Provisional application No. 61/809,721, filed on Apr. 8, 2013.

(51) Int. Cl.
*H04W 48/18* (2009.01)
*H04W 40/24* (2009.01)
(Continued)

(52) U.S. Cl.
CPC ............. *H04W 48/18* (2013.01); *H04W 8/10* (2013.01); *H04W 24/02* (2013.01);
(Continued)

(58) Field of Classification Search
CPC ............... H04L 65/80; H04L 67/1036; H04W 8/00–8/30; H04W 24/00–24/04;
(Continued)

(56) References Cited

U.S. PATENT DOCUMENTS

| | | | |
|---|---|---|---|
| 2010/0003980 A1* | 1/2010 | Rune | H04W 48/16 455/436 |
| 2010/0215019 A1* | 8/2010 | Velev | H04W 8/06 370/331 |
| 2015/0195858 A1* | 7/2015 | Jin | H04W 28/0268 370/230 |

OTHER PUBLICATIONS

3GPP TSG-RAN WG2 Meeting #81-BIS, on CN baseline for WLAN/3GPP Radio Interworking solutions, R2-130993, Broadcom Corporation, Apr. 15-19, 2013, Chicago, USA.
(Continued)

*Primary Examiner* — Timothy J Weidner

(57) ABSTRACT

In a method of enabling radio access network control of selection of radio access technology and traffic steering of radio bearers for user equipment in a heterogeneous wireless communication network, the network comprising at least one ANDSF policy server node with at least one associated user equipment and at least one radio access network node, performing the steps of exchanging at least core network information between the ANDSF policy server node and the at least one radio access network node over a provided communication interface, and controlling the selection of radio access technology and traffic steering of radio bearers for the at least one associated user equipment based on at least the exchanged core network information.

15 Claims, 10 Drawing Sheets

(51) Int. Cl.
    *H04W 36/26* (2009.01)
    *H04W 24/02* (2009.01)
    *H04W 8/10* (2009.01)
    *H04W 36/00* (2009.01)

(52) U.S. Cl.
    CPC ....... *H04W 36/0022* (2013.01); *H04W 36/26* (2013.01); *H04W 40/248* (2013.01)

(58) Field of Classification Search
    CPC .... H04W 36/00–36/385; H04W 40/00–40/38; H04W 48/00–48/20; H04W 64/00–64/006; H04W 76/00–76/068; H04W 84/00–84/22; H04W 88/00–88/12; H04W 92/00–92/24
    See application file for complete search history.

(56) References Cited

OTHER PUBLICATIONS

3GPP TSG-SA WG2 Meeting #78, DSMIPv6, Network-initiated IP Flow Mobility for Policy based traffic steering, S2-101090, Huawei, Deutsche Telekom, Feb. 22-26, 2010, San Francisco, USA.
Wi-Fi Roaming—Building on ANDSF and Hotspot2.0, Alcatel Lucent, 2012.

\* cited by examiner

NODE ARRANGEMENT AND A METHOD THEREIN

This application is a 371 of International Application No. PCT/SE2014/050364, filed Mar. 26, 2014, which claims the benefit of U.S. Provisional Application No. 61/809,721, filed Apr. 8, 2013, the disclosure of which is fully incorporated herein by reference.

TECHNICAL FIELD

The present invention relates to wireless communication systems, and particularly to an interface and arrangement for providing improved exchange of core network information in heterogeneous wireless communication systems.

BACKGROUND

At present mobile traffic demands are increasing and will most likely exceed network capacities within the foreseeable future. One manner in which operators are fighting the increasing traffic demands is by utilizing heterogeneous access networks. In heterogeneous access networks, mobile operators can move traffic from the cellular network, where the capacity constraints are most severe, to cheaper shorter-range wireless local area networks e.g. Wi-Fi. One problem with such complex mixes of cellular networks and wireless local area networks is the implementation of efficient policies to control the mobility behavior of the user equipment when moving between the cellular network and the wireless local area network and also efficient radio access selection and traffic steering for the user equipment. In particular, there is little consistency between mechanisms used by e.g. Wi-Fi operators and those used by cellular operators to control for example network discovery, network selection, traffic prioritization, user authentication, roaming capabilities and quality of service (QoS). At present, this also applies for the case when it is the same cellular operator providing the Wi-Fi related information. Roaming capabilities may refer to the capabilities of the user equipment moving both between the cellular network and the wireless local area network and between cellular networks from different cellular operators.

In legacy 3GPP networks, the focus has been on network control of both user equipment (UEs) and usage of spectrum and network resources. There have been many arguments for that, e.g. the network has more information and thus ability to jointly optimize the network and end user performance, leading to user satisfaction at a lower cost. In addition, the performance becomes more predictable, because it does not depend on different UE implementations.

The information needed for efficient selection of the most suitable radio access technology (RAT) is large, is stored partly in the Core Network, and partly in the Radio. Network, see below FIG. 1. Almost all Core network information is currently passed on to the radio access network (RAN), mainly when the UE becomes "RRC Connected" and when "Radio Bearers" are added. Examples are cooperating/allowed PLMNs, subscription (allowed RATs, QoS rules), services (QoS rules). This information is passed for example over the respective so-called A/Gb, Iu and S1 interfaces. The RAN has information about e.g.: available cells and radio technologies, quality of existing and potential radio links, cell loads including the mix of UEs with different QoS requirements present in different cells, etc. RAN makes a composite decision, taking both Core Network and Radio Network information into account.

In contrast, the current WLAN-3GPP integration method is UE-centric. The UE is provided with (mainly) Core Network information using the ANDSF method; see below description in relation to FIG. 2. The content of this information is largely corresponding to the information that is passed over the so-called A/Gb, Iu and S1 interfaces. Furthermore, the existing interfaces between Core Network and 3GPP RAN has no WLAN-related information at all. Upgrading the Core Network to provide such WLAN-related information may be considered complex, since it affects many nodes.

The so-called Access Network Discovery and Selection Function (ANDSF) is a 3GPP defined function (since 3GPP Rel-8 and continues to evolve) and provides the possibility to send different policies to the UE for network discovery and selection (see FIG. 2). The communication between the UE and the ANDSF server is defined as an IP-based S14-interface. The communication between the UE and the ANDSF server typically consists of the following distinct information elements, access discovery information, inter-system mobility policies, and inter-system routing policies.

Access Discovery Information (ANDI) is used to provide access discovery information to the UE, which can assist the UE to discover available (3GPP and) non-3GPP access networks without the burden of continuous background scanning.

Inter-System Mobility Policies (ISMP) are policies which guide the UE to select the most preferable 3GPP or non-3GPP access. The ISMP are used for UEs that access a single access (3GPP or Wi-Fi) at a time.

Inter-System Routing Policies (ISRP) are policies which guide the UE to select over which access a certain type of traffic or a certain APN shall be routed. The ISRP are used for UEs that access both 3GPP and Wi-Fi simultaneously.

The above ANDI, ISMP and ISRP have been extended with additional policies in the later 3GPP releases, for example WLAN selection policy (WLANSP) and Inter-APN Routing Policies (IARP) policies.

The roaming architecture for ANDSF (source is FIG. 4.8.1.1-2 in 3GPP TS 23.402) is illustrated in FIG. 3 of this disclosure. As mentioned previously, the term roaming is used to indicate the mobility behavior when a user equipment moves between a cellular network and a wireless local area network or when a user equipment moves between cellular networks from different cellular operators.

The mobile network architecture for the case of LTE/EPC and Wi-Fi is illustrated in FIG. 4, with a multitude of interfaces represented between the various elements of the network.

At present focus has shifted to enable a less UE centric control of the use of 3GPP and WLAN. Consequently, there is a need to improve the architecture in order to allow a less UE centric control in heterogeneous wireless communication systems.

SUMMARY

It is an object to provide an improved policy node arrangement and an improved radio access network node arrangement enabling improved exchange of core network information.

This and other objects are met by embodiments of the proposed technology.

In a first aspect the present disclosure presents a method of enabling radio access network control of selection of radio access technology and traffic steering of radio bearers for user equipment in a heterogeneous wireless communication network, said network comprising at least one ANDSF policy server node with at least one associated user equipment and at least one radio access network node. The method includes the steps of exchanging at least core network information between the ANDSF policy server node and the at least one radio access network node over a provided communication interface, and controlling selection of radio access technology and traffic steering of radio bearers for the at least one associated user equipment based on at least the exchanged core network information.

In a second aspect the present disclosure presents a method of exchanging information between a ANDSF policy server node and a radio access network node in a heterogeneous wireless communication network. The method includes the ANDSF policy server node performing the steps of receiving a query, from said radio access network node, for information related to an identified user equipment associated with said ANDSF policy server node, over a provided communication interface, and providing at least core network information related to the identified user equipment in response to the query, and responding to the query by providing the queried information to the radio access network node over the provided communication interface.

In a third aspect the present disclosure presents a method of controlling operation of a heterogeneous wireless communication network, said network comprising at least one ANDSF policy server node, at least one user equipment associated with the ANDSF policy server node, and at least one radio access network node. The method includes the radio access network node performing the steps of transmitting a query, over a provided communication interface, for information relating to an identified user equipment associated with the ANDSF policy server node to the ANDSF policy server node, and receiving a query response, over the provided interface from the ANDSF policy server node, the query response comprising at least core network information related to the identified user equipment. Further the method includes the radio access network node performing the steps of handling the core network information for the identified user equipment and optimizing the operation of the network based on at least the received and handled information.

In a fourth aspect the present disclosure presents an ANDSF policy server node configured to provide policies concerning network discovery and selection of radio access technology and traffic steering of radio bearers for an associated user equipment. The ANDSF policy server node is configured to receive queries from a radio access network node, the queries relating to the user equipment associated with the ANDSF policy server and receiving a user equipment identity for the user equipment. Further, the ANSDF policy server node is configured to provide core network related information for said identified user equipment and generate and transmit responses to the received queries to the radio access network node, the response comprising at least the core network related information.

In a fifth aspect the present disclosure presents a computer program comprising instructions which when executed by at least one processor, cause the processor(s) to receive queries from a radio access network node, for information relating to an identified user equipment associated with a ANDSF policy server node, and receive a user equipment identity for the identified user equipment; and provide core network related information for the identified user equipment, and generate and transmit responses to the received queries to the radio access network node, the response comprising at least the core network related information.

In a sixth aspect the present disclosure presents a radio access network node configured to manage network discovery and selection of radio access technology and traffic steering of radio bearers in a heterogeneous wireless communication network, wherein the radio access network node is configured to generate and transmit queries to a ANDSF policy server node, the queries concerning information related to identified user equipment associated with the ANDSF policy server, and receive query responses from the ANDSF policy server node, the query responses comprising at least core network information. Further, the radio access network node is configured to handle the core network information for the identified user equipment, and optimize the network based on at least radio access network information for the identified user equipment and the provided core network information.

In an seventh aspect the present disclosure presents a computer program comprising instructions, which when executed by at least one processor, cause the processor(s) to generate and transmit queries for information related to identified user equipment associated with a ANDSF policy server node to the ANDSF policy server node (1), and receive query responses from the ANDSF policy server node, the query responses comprising at least core network information for the identified user equipment. Further the processor handles queried core network information for the identified user equipment, and optimizes the network based on at least radio access network information for the identified user equipment and the provided core network information.

Advantages of the present disclosure enables improved exchange of core network information between entities in a heterogeneous wireless communication system.

BRIEF DESCRIPTION OF THE DRAWINGS

The invention, together with further objects and advantages thereof, may best be understood by referring to the following description taken together with the accompanying drawings, in which.

ABBREVIATIONS

Figure 1:
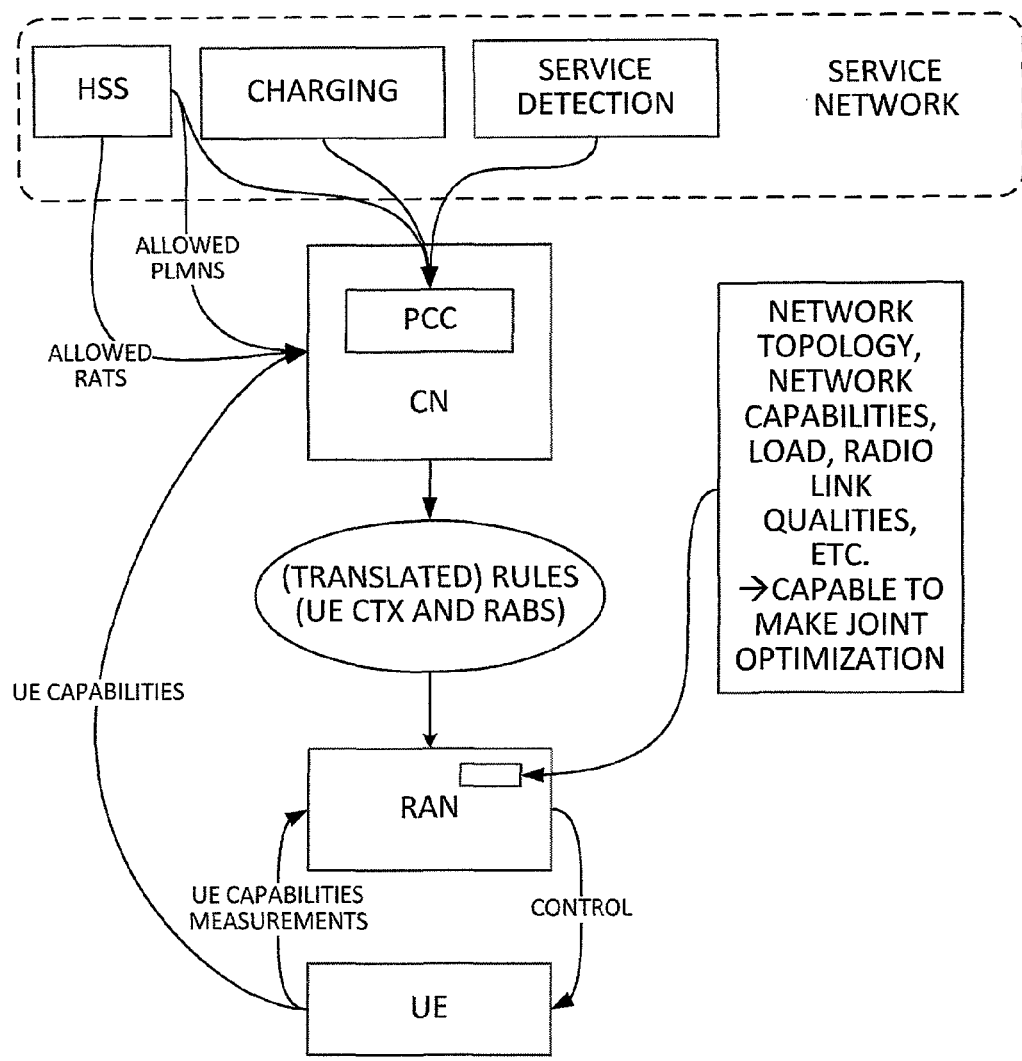
FIG. 1 is a schematic illustration of a legacy intra-3GPP architecture, in which the current embodiments can be implemented.
Figure 2:
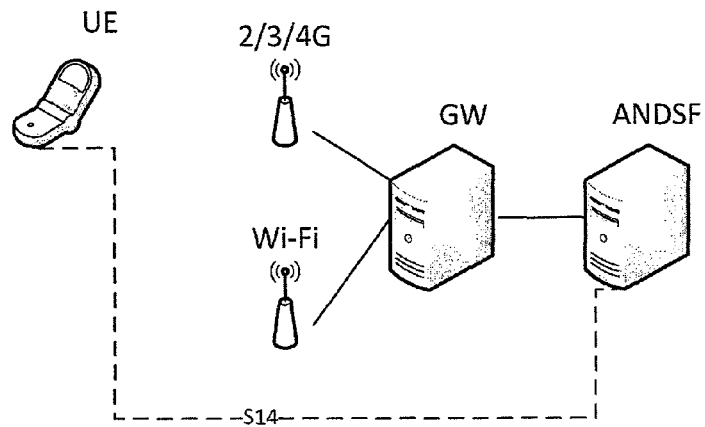
FIG. 2 is a schematic illustration of prior art.
Figure 3:
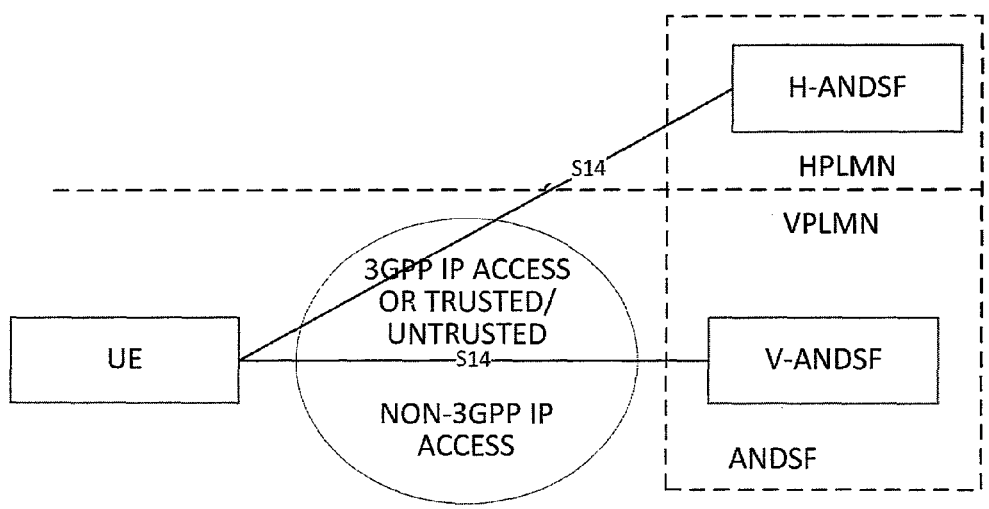
FIG. 3 is a schematic illustration of the roaming architecture for related to ANDSF and shows that different ANDSF servers can be located in the HPLMN and in the VPLMN.
Figure 4:
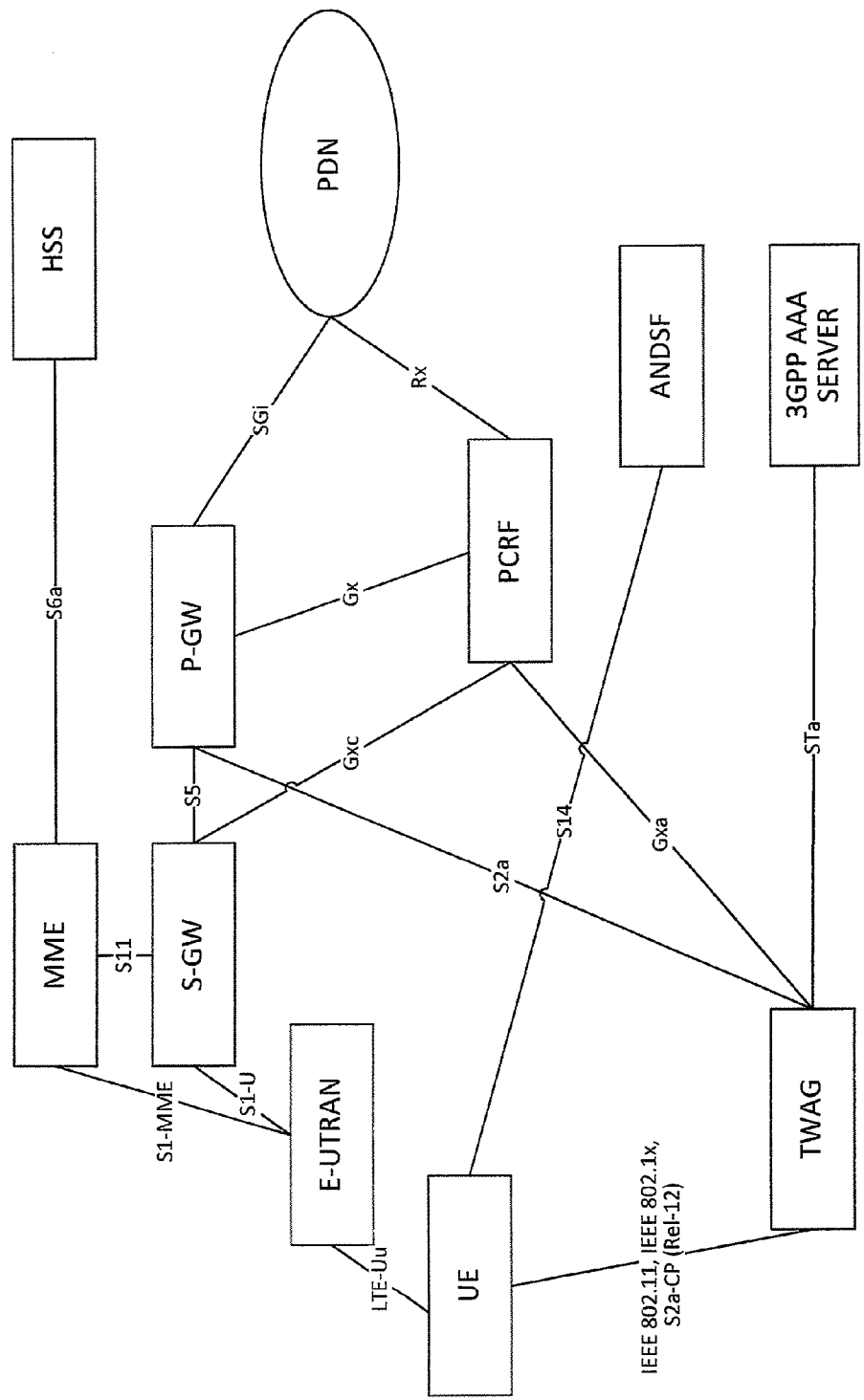
FIG. 4 is a schematic illustration of the various interfaces in prior art.

ANDSF Access Network Discovery and Selection Function
CN Core Network
BSC Base Station Controller
DHCP Dynamic Host Configuration Protocol
DNS Domain Name System
E-UTRAN Evolved Universal Terrestrial Radio Access Network
H-ANDSF Home-ANDSF
HPLMN Home PLMN
HSS Home Subscriber Server
GW GateWay
IMEI International Mobile Equipment Identity
IMSI International Mobile Subscriber Identity
ISMP Inter-System Mobility Policies
ISRP Inter-System Routing Policies
MME Mobility Management Entity
QoS Quality of Service
P-GW PDN Gateway
PCRF Policy and Charging Rules Function
PCC Policy and Charging Control
PDN Public Data Network
PLMN Public Land Mobile Network
RAN Radio Access Network
RAT Radio Access Technology
RNC Radio Network Controller
S-GW Serving-GW
TWAG Trusted WLAN Access Gateway
TWAN Trusted WLAN Access Network
UE User Equipment
V-ANDSF Visiting-ANDSF
VPLMN Visiting PLMN
WLAN Wireless Local Area Network

DETAILED DESCRIPTION

The present disclosure relates to heterogeneous communication systems in general, and particularly to the cooperation between cellular networks such as 3GPP compliant wireless communication systems and local wireless communication systems e.g. WLAN. In particular, the present disclosure concerns enabling transferring Core Network information needed to enable steering radio access technology (RAT) and bearer selection between 3GPP and Wi-Fi from the Radio Access Network.

Although the present disclosure the term "core network information" is used, the embodiments are equally applicable to exchange or transfer of other network related information as well, such as e.g. service network information.

The aforementioned shift to enable a less UE centric control of the use of 3GPP and WLAN, gives rise to at least two main issues. Assuming RAN control of UE use of 3GPP vs. Wi-Fi will be introduced into the current standard; there are two issues, namely:

Basic issue: A mechanism to provide RAN nodes with Core Network information related to WLAN must be introduced.

Secondary issue: adding such info in the 'regular way', i.e. over A/Gb, Iu and S1, may be considered too complex, at least in earlier evolution steps.

In a first aspect the present disclosure presents a novel interface enabling exchange of core network information between policy servers e.g. ANDSF servers and radio access network nodes in heterogeneous wireless communication networks.

In a second aspect, the present disclosure includes a policy server arrangement, or policy server node, or policy node including a general input output unit I/O for receiving and transmitting signals. The terms policy server arrangement, policy server node and policy node are used in a completely interchangeable manner in this disclosure. Further, the arrangement includes a query unit, which is configured for receiving queries from RAN nodes in a heterogeneous wireless communication system. Further, the arrangement includes an ID unit for receiving UE identity and optionally location information relating to user equipment associated with the policy server arrangement. In addition, the arrangement includes a core network information unit, which is configured for maintaining and providing information relating to the core network. Finally, the arrangement includes a query response unit, which is configured to generate and transmit responses to received queries from RAN nodes. In addition, the policy server arrangement includes any elements necessary for performing known measure in a policy server.

In a third aspect the present disclosure includes a RAN node arrangement including a general input output unit I/O for receiving and transmitting signals in the RAN node arrangement. Further, the arrangement includes a query unit, which is configured for generating and transmitting queries to policy nodes e.g. ANDSF nodes in a heterogeneous wireless communication system. Further, the RAN node arrangement includes a unit for receiving query responses from policy nodes generated in response to the transmitted query. Further, the RAN node arrangement includes a unit for handling optional location information as well as provided core network information received in the query response. Finally, the RAN node arrangement includes a unit for joint optimization of the heterogeneous network based on at least RAN information for the identified UE and location in question and core network information. In this sense, the RAN information for the UE includes e.g. the radio link quality, and the location information is e.g. the surrounding cells and cell loads. In addition, the RAN node arrangement includes any elements necessary for performing known measure in a RAN node arrangement. Optionally, also other information than the core network information could be included, such as service network information.

In a fourth aspect the present disclosure includes receiving in a policy server node a query for a particular user equipment from a source RAN node over an interface. The policy server node maintains at least UE identity, and optionally received location information in a register or is configured to look up the information from a register in response to a received query. In addition, the policy server node is configured to maintain and provide core network information in a register or is configured to look up the information from a register in response to a received query. Finally, the policy server node responds to the received query by providing the queried information to the querying RAN node.

In a fifth aspect the present disclosure includes transmitting from a RAN node a query for a particular user equipment to a policy server node in a heterogeneous wireless communication system over an interface. In response to the transmitted query, the RAN node receives a response to the query. Subsequently, the RAN node handles core network information provided in the response. Finally, the RAN node optimizes the operation of the heterogeneous wireless communication network based on the received information.

The proposed technology may be applied to a user terminal, which may be a wired or wireless device.

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the term "wired device" may refer to any device configured or prepared for wired connection to a network. In particular, the wired device may be at least some of the above devices, with or without radio communication capability, when configured for wired connection.

As used herein, the non-limiting term "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

Throughout the drawings, the same reference designations are used for similar or corresponding elements.

As used herein the term query may be used as an abbreviation for "query for information related to an identified user equipment" or similar. In all cases, the query concerns particular information e.g. core network information for a particular user equipment associated with a queried ANSDF policy server node.

As identified in the background section, the server arrangement in a 3GPP network responsible for providing core network information to a user equipment UE is the so-called ANDSF server or ANDSF policy server node. In the following, the terms ANDSF server and ANDSF policy server node and ANSDF policy server node arrangement will be used in an exchangeable manner. The server arrangement can be implemented as a stand-alone physical server or as a software implementation in a network node. In prior art the ANDSF server is configured for communicating with each user equipment over the so-called S14 interface. However, since prior art systems have been aimed at a more UE centric system, the ANDSF server has not been able to communicate its information concerning the core network to any other entities in the radio access network (3GPP or WLAN) than the user equipment. This has effectively prevented a more centralized management of cooperation between e.g. E-UTRAN and WLAN entities in order to provide an optimized service to all UEs.

A typical ANDSF server node of the 3GPP standard is an entity, which is aware of everything concerning the relation between the Wi-Fi network(s) and the 3GPP network(s). However, any information that is available in the known ANDSF server can only be communicated to the user equipment. Consequently, the radio access network is wholly unaware of any policy that the ANDSF server uses for the associated user equipment. This might lead to a non-optimal utilization of the system resources. Further, only the core network is aware of each users subscriptions, allowed capacity etc. In addition, this prevents any higher-level optimization of the system since ANDSF server policies might be contra productive to the RAN policies.

The inventors have therefore identified the benefits of implementing a novel interface, which enables direct communication and exchange of core network information and optionally service network information between the ANDSF entity or server and the radio access network (RAN) nodes, in particular between the ANDSF server and the 3GPP radio access network nodes. The interface can likewise be implemented between the Trusted WLAN Access Gateway (TWAG) and the ANDSF server. Thereby, it is possible to achieve a joint optimization of service to all UEs, not only to a single UE. The novel interface could be an entirely new interface S14' that is implemented in addition to the already known S14 interface, or as a modified S14 interface.

By providing the novel interface S14', it is possible to provide a wide range of embodiments all aimed at improving and optimizing the performance of the system. These embodiments will be described in more detail below, with reference to the attached set of drawings.

Figure 5:
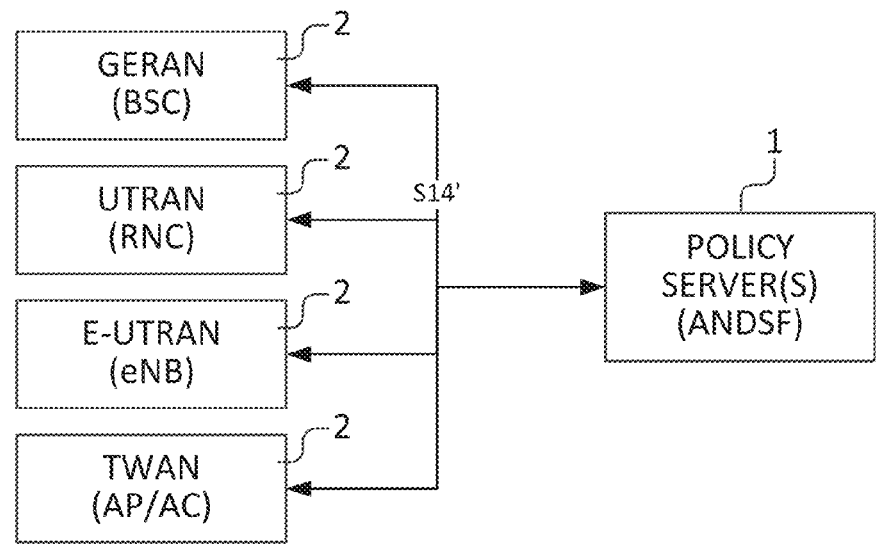
FIG. 5 is an illustration of an embodiment according to the current disclosure.

With reference to FIG. 5, an embodiment of an interface S14' according to the present disclosure will be described. As shown in the figure, the interface S14' can be configured to allow exchange of core network information and optionally service network information between a policy server e.g. ANDSF server 1 and a plurality radio access network (RAN) nodes 2 belonging to a plurality of radio access technologies (RAT) e.g. base station control (BSC) nodes in GERAN, radio network control (RNC) node in UTRAN, eNB node in E-UTRAN or Access Point/Access Controller (AP/AC) node in TWAN. The communication can be bi-directional, thus constituting an actual exchange of information, or one-directional to enable the ANDSF server (or other policy server) to provide at least core network information to the various RAN nodes. According to a particular embodiment, the interface S14', which is a direct query interface to a policy server e.g. ANDSF server, is configured to be triggered by the RAN, potentially in response to a UE transiting to RRC Connected state or similar depending on the RAT used. The query typically includes the UE identity and includes a request for information relating to the identified UE and optionally includes information concerning its location.

Figure 6:
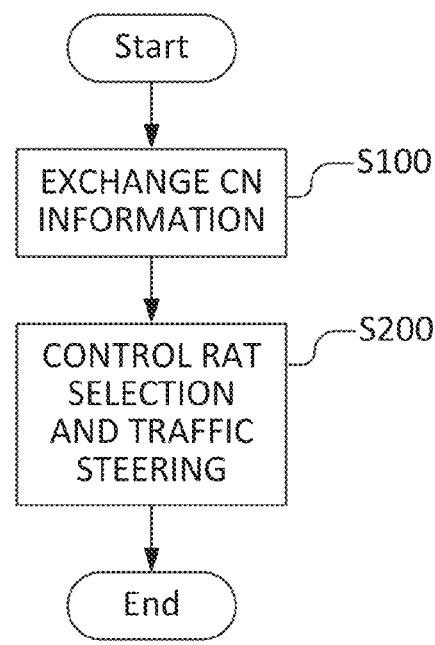
FIG. 6 is an illustration of an embodiment according to the current disclosure.

With reference to FIG. 6, an embodiment of a general method of enabling radio access network control of selection of radio access technology and traffic steering of radio bearers for user equipment in a heterogeneous wireless communication network, which network comprises at least one ANDSF policy server node 1 with at least one associated user equipment and at least one radio access network node 2, will be described. The method includes the steps of exchanging S100 at least core network information between the ANDSF policy server node 1 and the at least one radio access network node 2 over a provided communication interface S14', and controlling S200 the selection of radio access technology and traffic steering of radio bearers for the at least one associated user equipment based on at least the exchanged core network information.

Figure 7:
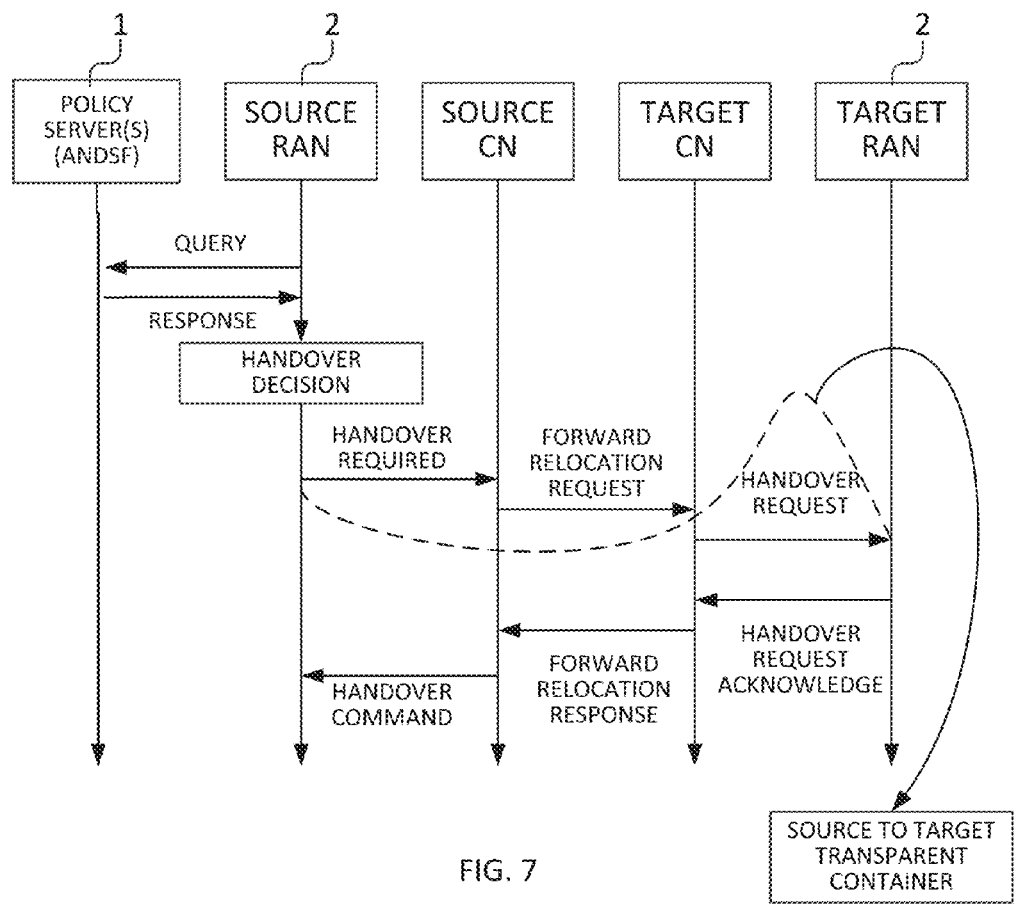
FIG. 7 is a signaling diagram of an embodiment of the current disclosure.

An embodiment of a signaling scheme according to the present disclosure will be described, with reference to FIG. 7. In this example a system including a policy server 1 e.g. ANDSF server node, a source RAN node 2, a target RAN node 2, and corresponding source and target core networks (CN) are depicted. The source RAN node triggers the interface S14' by transmitting a query for information related to an identified user equipment associated with the ANDSF server node 1 to the policy server node 1. In response to receiving the query, the policy server node 1 responds with CN information, which is subsequently used by the source RAN node to optimize its operation and potentially decide on performing a handover for an identified UE. According to a particular embodiment, the information received from the ANDSF server may be appended to the source to target container passed transparently between RAN nodes as part of handover preparation phase signaling, in order to avoid repeated ANDSF server query at all handovers. The "source to target container" is different depending on the target RAT for the handover, see examples below.

a) If the target RAT is LTE, include ANDSF information such as core network information and optionally service network information in the "Source eNB to Target eNB Transparent Container IE" defined in 3GPP TS 36.413. However, the intra-LTE handover case could likely be supported also by using other information elements available in the X2 signaling.

b) If the target RAT is WCDMA/UTRAN, include ANDSF information such as core network information and optionally service network information in the "Source RNC to Target RNC Transparent Container IE" defined in 3GPP TS 25.413.

c) If the target RAT would be GSM/GERAN, include ANDSF information such as core network information and optionally service network information in the "Source BSS to Target BSS Transparent Container IE" as defined in 3GPP TS 48.018.

d) If the target RAT would be GSM/GERAN and a Single-Radio Voice Call Continuity (SRVCC) handover would be triggered, then include ANDSF information such as core network information and optionally service network information in the "Old BSS to New BSS information IE" as defined in 3GPP TS 48.008.

It can be noted that the forwarding of Core Network information at handover is done by the Core Network in the current 3GPP (non-WLAN) architecture. Carrying the WLAN-related Core Network information in the Source to Target Transparent Containers is a method to avoid updates to the Core Network. The forwarding of Core Network information can also be done directly between two radio network nodes (for example between two eNBs over an X2-interface).

Figure 8:
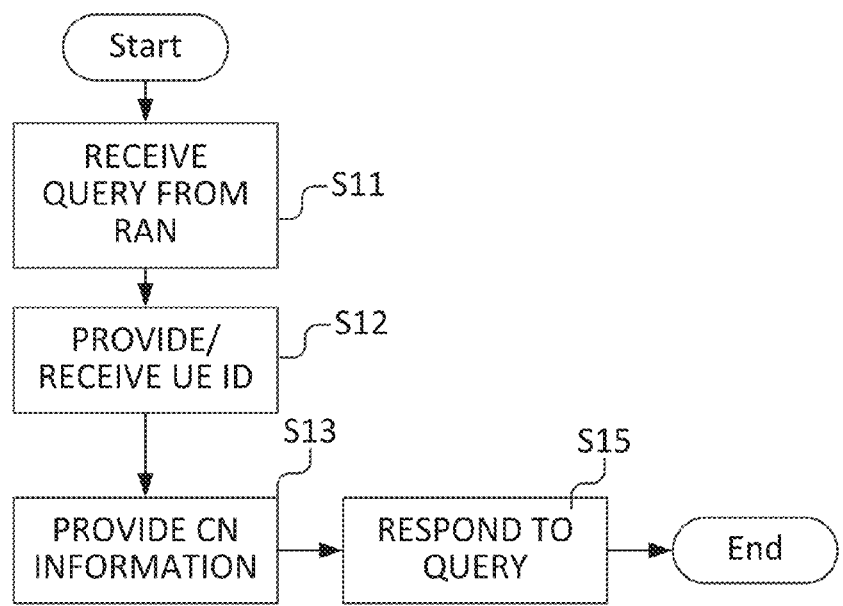
FIG. 8 is a schematic flow diagram of an embodiment of a method in a policy server arrangement according to the current disclosure.

In order to utilize the above described interface S14', the respective ANSDF policy server node 1 and the radio access network node 2 may need to be configured accordingly. With reference to FIG. 8 an embodiment of a method of exchanging information between a ANDSF policy server node and a radio access network node in a heterogeneous wireless communication network will be described, viewed from the actions performed by the ANDSF policy server node 1. The ANSDF policy server node 1 has at least one user equipment associated with it, which it provides policies to. Initially the ANDSF server node receives, in step S11, a query, from the radio access network node, for information related to an identified user equipment associated with the ANDSF policy server node 1, over a provided communication interface S14'. The ANSDF server node 1 receives, in optional step S12, the UE ID for the identified user equipment and optionally information of the current location of the UE. This can comprise retrieving the UE ID from the received query, or retrieving the UE ID from a register based on information provided in the query. Additionally, the ANSDF policy server node 1 provides, in step (S13), at least core network information related to the identified user equipment in response to said query. This can include retrieving stored core network information from a register or requesting the information from some other entity in the system. Finally, the ANSDF server node 1 responds, in step S15, to the query by providing the queried information to the radio access network node 2 over the provided communication interface (S14').

According to a particular embodiment the UE identity is part of the actual query response, or, according to a further embodiment, the whole query-query response is transactional (i.e. the lower layers of the communication provide the association).

In addition, according to a further embodiment, the received query can comprise location information for said identified user equipment.

In other words, a policy server node 1 receives, in step S11, a query for information relating to a particular or identified user equipment from a source RAN node 2 over an interface S14'. The policy server node 1 maintains and provides, in step S12, UE identity, and optionally location information in a register or is configured to look up the information from a register in response to a received query S11. The term provides in this aspect can be viewed as multiple variants of handling the UE identity contained in the query. In other words, providing a UE identity can be used to represent the case where the ANDSF server node has a register containing associated user equipment and information related thereto, and the ANDSF server node locates any information related to the queried user equipment. Another possible meaning of the word providing could be where the ANDSF server node queries another entity for the UE identity and any information related thereto. In addition, the policy server node 1 is configured to maintain and provide, in step S13, core network information in a register or is configured to look up the information from a register in response to a received query based on a provided UE ID. Finally, in step S15 the policy server node 1 responds to the received query by providing the queried information to the querying RAN node 2.

Figure 9:
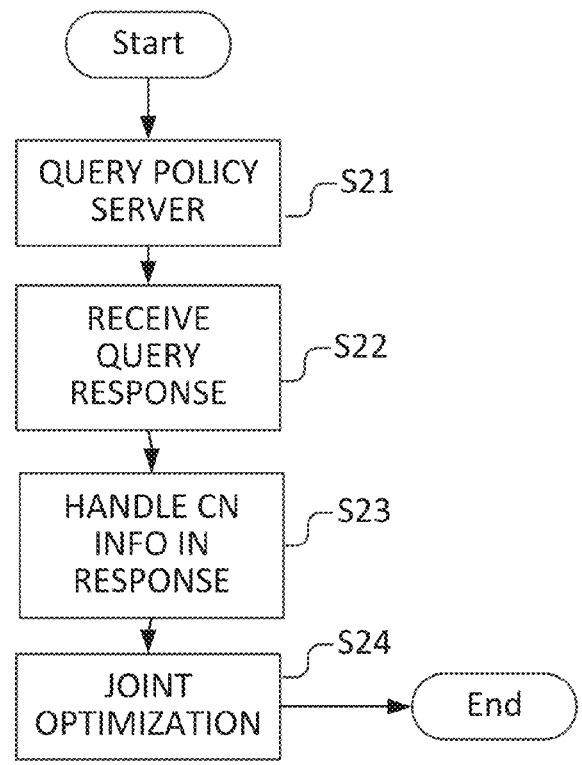
FIG. 9 is a schematic flow diagram of an embodiment of a method in a radio access network node arrangement according to the current disclosure.

With reference to FIG. 9, an embodiment of a method of providing core network information from a policy server 1 e.g., ANDSF server node 1 to a RAN node 2 will be described. In other words, also with reference to FIG. 9, an embodiment of a method of controlling operation of a heterogeneous wireless communication network, the network comprising at least one ANDSF policy server node 1 or policy server node arrangement, at least one user equipment associated with the ANDSF policy server node, and at least one radio access network node (2), will be described viewed from the actions performed by the radio access network node 2. Initially the radio access network node 2 transmits a query, in step S21, over a provided communication interface S14', for information relating to an identified user equipment associated with the ANDSF policy server node 1 to the ANDSF policy server node 1, and receives a query response, in step S22, over the provided interface S14' from the ANDSF policy server node 1, the query response comprises at least core network information related to the identified user equipment. Finally, the radio access network node 2 handles, in step S23, the received core network information for the identified user equipment and optimizes S24 the operation of the network based on at least the received and handled information.

According to a further embodiment, the radio access network node 2 is configured to include location information for the identified user equipment in the query.

In other words, the RAN node 2 transmits, in step S21, a query for a particular user equipment to a policy server node 1 in a heterogeneous wireless communication system over an interface S14'. In response to the transmitted query, the RAN node 2 receives, in step S22 a response to the query. Subsequently, in step S23, the RAN node 2 handles core network information provided in the response. Finally, the RAN node 2, in step S24, optimizes the operation of the heterogeneous wireless communication network based on the received information. The optional location information is, as is understood by the skilled person, provided and utilized by the RAN node 2, but can also be communicated from the RAN node 2 to the ANDSF server node In order for radio access network nodes 2 in the radio access network (RAN) to be able to receive core network information over the novel ANDSF interface S14', each radio access network node 2 needs, according to a further embodiment, to be able to locate and identify available ANDSF server nodes 1. Consequently, according to further embodiments, the radio access network node 2 performs the steps of identifying a user equipment, and locating any available ANDSF policy servers with which the identified user equipment is associated. The identification step can comprise the radio access network node receiving an indication that a user equipment has entered a predetermined mode such as a RRC connected mode in 3GPP or Associated mode in WLAN. In addition, the locating step can comprise transmitting a DNS query for available ANDSF policy server nodes to a DNS server.

Figure 10:
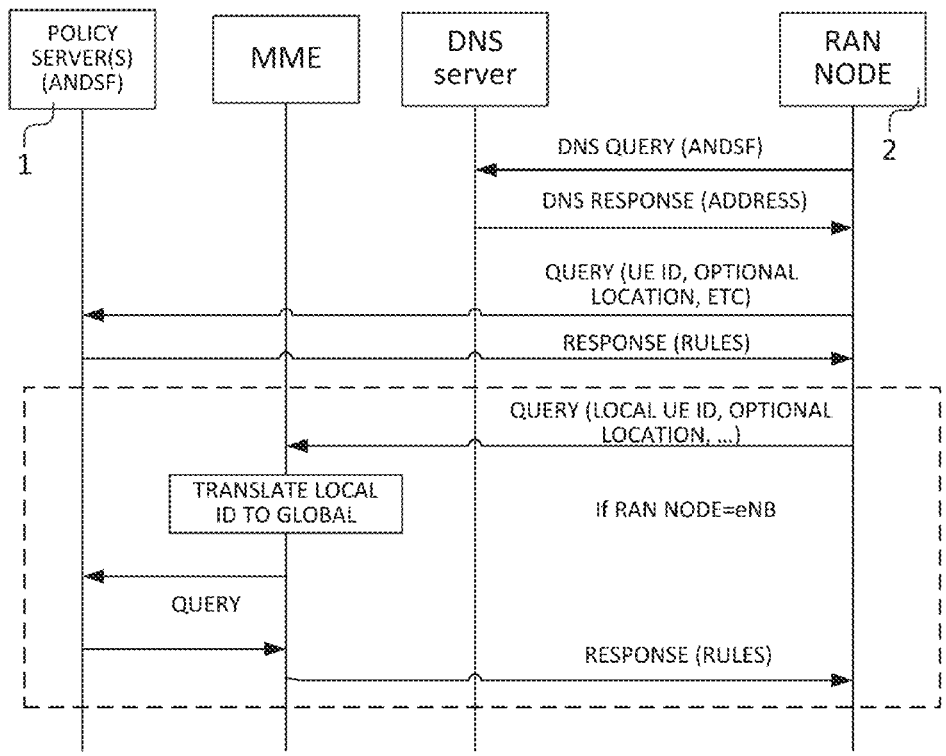
FIG. 10 is a signaling diagram of a further embodiment of the current disclosure.

In addition, according to a further embodiment and with reference to FIG. 10 each RAN node is configured to transmit a DNS query to the relevant DNS server, requesting information about available policy servers 1. The DNS query may be at least partly based on the identity of the identified user equipment. In response thereto the RAN node 2 will receive a DNS response, which includes an address to a particular policy server e.g. ANDSF server node 1. The RAN node 2 is then configured to transmit a query to the provided address; the query will include at least an identity of a user equipment and potentially any RAN information related thereto and an optional location for that user equipment. Subsequently, the policy server 1 will respond with a set of rules for the addressed UE to the RAN node. If the RAN node is an eNodeB in a E-UTRAN then the RAN node can query the MME for the rules, without a direct contact with the policy server 1.

A further embodiment of a method according to the present disclosure will be described below. This embodiment also discloses how a RAN node 2 or radio access network node can find an ANDSF server node 1, and how it is possible to provide a globally unique UE identity.

The embodiment of a method for RAN nodes 2 to find the ANDSF server 1, which is applicable to this particular UE, can be described as follows. In known 3GPP standard document 3GPP TS 24.302, it is stated that:

"If not provisioned in the UE, for the case of a UE located in a home PLMN or an equivalent HPLMN, the IP address of the H-ANDSF can be discovered by the UE using a DHCP query as specified in IETF RFC 6153. The H-ANDSF IP address by which the UE can contact the H-ANDSF can also be obtained by the UE through a DNS lookup by name as specified in IETF RFC 1035. The V-ANDSF IP address by which the UE can contact the V-ANDSF is obtained by the UE through a DNS lookup by name as specified in IETF RFC 1035".

Another proposed embodiment of a method according to the present disclosure includes that:

a) the RAN nodes 2 are configured with the method in use in that network, b) RAN nodes 2 use IMSI as UE identifier (available in A, Gb and Iu interfaces, can be deduced by query to (or via, which is shown in FIG. 10) MME when the UE is connected to E-UTRAN), c) RAN nodes 2 will learn the UE roaming status (roaming or not roaming). Roaming in this sense indicates that the UE is or is not moving between cellular networks from different cellular operators. This can be done e.g. by analysis of the HPLMN number, which is part of IMSI.

The RAN nodes can then use the same procedure as a UE uses. Differentiation between UE communication and RAN node communication can be done by port number or other means on the ANDSF server side.

Additionally, according to a particular embodiment, before the RAN node 2 queries the ANDSF server 1, it must have a secure communication link. This can be achieved by several means, e.g. a separate and secure transport network between RAN nodes 2 and the ANDSF server(s) 1 in the same network. An alternative approach is that RAN nodes 2 initiate IPsec Security Associations with all ANDSF servers 1, e.g. based on GBA procedure (3GPP TS 33.220) using credentials for the RAN node 2. The ANDSF node 1 thus considers the RAN node 2 as validated and accepts queries for the UE the RAN node identifies. These approaches may not work if radio nodes need to access the H-ANDSF of a roaming subscriber (assuming there is no V-ANDSF). In that case (a) default rules may be applied in the RAN node or (b) a "dummy V-ANDSF" is created, which acts as a gateway to home network, in a similar way as HSS is accessed.

When the RAN node 2 queries the ANDSF server 1, it must identify the UE. The proposed solution is (a) to use IMSI, when it is known (GERAN, UTRAN, sometimes also E-UTRAN) or (b) pass the query through MME, which adds IMSI (remaining cases for E-UTRAN).

Figure 11:
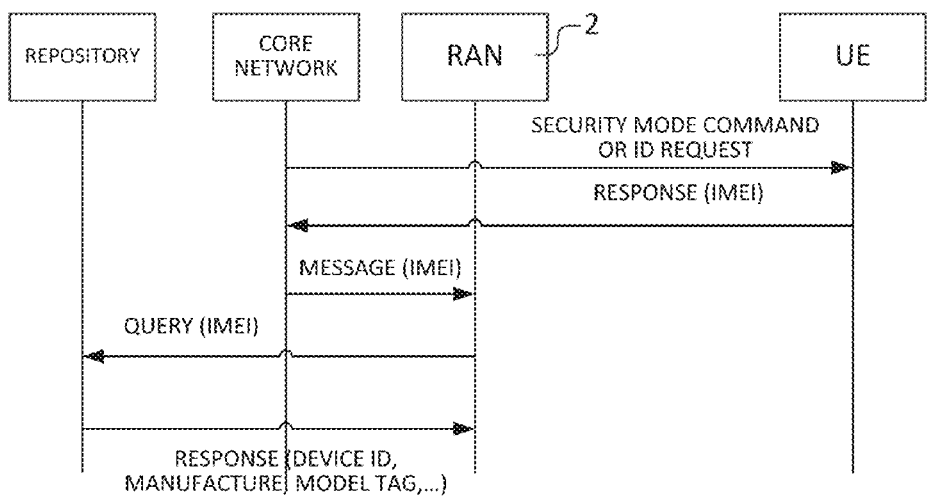
FIG. 11 is a signaling diagram of a further embodiment of the current disclosure.

According to a further embodiment, it might be necessary to find particular device information, which is illustrated in FIG. 11. The RAN query interface can be 'location independent' or not. In the latter case, the query must include a UE position. Many options are possible, e.g., those presented in 3GPP TS 24.312 clause 5.6. If the UE location is not known, then corresponding parameters for the querying RAN node can be used. One additional example is to use the measurement reports received from the UE to include information similar to the information provided by the UE to the ANDSF server. This information would then include for example the global cell identifiers for the different cells reported by the UE.

It can be noted that a regular S14 information transfer goes through OMA-DM Set-up and Data Management phases per UE. The network query protocol does not need a Set-up phase per UE.

In the S14 Set-up phase the UE provides the ANDSF server with the following information:
1. Device information e.g. device id, manufacturer, model tag, phone language and DM protocol version
2. Client credentials used for authentication purposes unless GAA is used.
3. Indication whether the incoming session is client or server initiated.

The Query protocol may optionally provide information 1 (e.g. by lookup based on IMEI) and does not require information 2-3 above.

The concept of 'ANDSF server' could be seen as potentially a set of servers. Current non-exclusive examples are:
ANDSF server as described in e.g. 23.401 and 24.312
I-WLAN server as described in e.g. 24.234 and 24.235
any server or function that can provide IMS Management Objects (MO) as described in e.g. 3GPP TS 24.167 (including extensions for IMS over WLAN).

In the above, several MOs are defined in current 3GPP standards, of which some are associated with a respective dedicated server and others are not. In the case of an ANDSF MO there is a dedicated ANDSF server. However, the teachings of the current disclosure are equally applicable for the case of a policy entity or MO that is not associated with a dedicated server.

The information provided by ANDSF over the new interface S14' may be according to current specifications or translated according to what RAN needs. One example: ANDSF Managed Object contains PLMN IDs. RAN nodes may not be configured to know the mapping between PLMN and carrier frequencies or SSIDs. The ANDSF server may instead be configured with such a mapping, so that the information provided to the RAN contains immediately useful parameters.

In order to enable the set up and use of the novel interface S14' according to the current disclosure, it is necessary to configure the radio access network nodes 2 and the policy server node 1 according to particular measures.

In addition, prior to the actual utilization of the novel interface S14' between the RAN node 2 and the policy node 1, a setup procedure may need to be implemented, in which the RAN node 1 searches for any available policy servers 1 by e.g. a DNS query or similar, as described with reference to FIG. 10. When an ANSDF policy server 1 has been located, the RAN node 2 can initiate the interface S14' by transmitting a query for a particular user equipment based on the address information provided by the DHCP, DNS or similar entity.

In particular, the ANSDF policy server node 1 may need to be adapted according to the following embodiment. In particular, an ANDSF policy server node 1 can be configured to provide policies, upon request, concerning network discovery and selection of radio access technology and traffic steering of radio bearers for an associated user equipment, wherein the ANDSF policy server node 1 is configured to receive queries from a radio access network node 2, which queries include request for information e.g. core network information, that relate to the user equipment associated with the ANDSF policy server 1. Further, the ANDSF policy server node 1 is configured to receive a user equipment identity for the user equipment, and provide core network related information for the identified user equipment, and to generate and transmit responses to the received queries to the radio access network node 2, which response comprises at least the core network related information.

Figure 12:
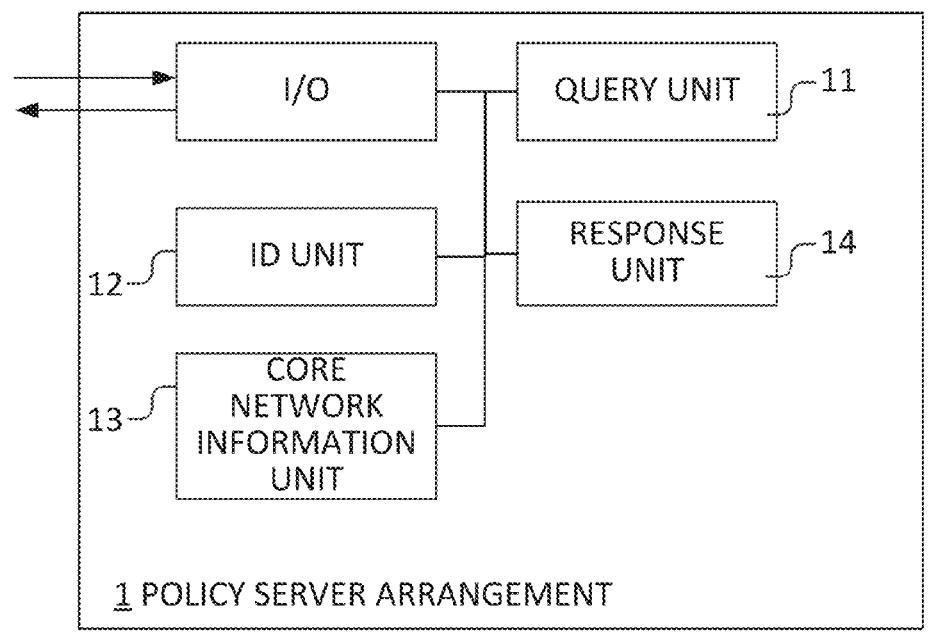
FIG. 12 is a schematic illustration of an embodiment of a policy server arrangement according to the current disclosure.

With reference to FIG. 12, an embodiment of a policy server arrangement 1 will be described. Although the majority of the disclosure uses the term ANDSF server node, it is equally applicable to any other (one or groups of) policy server in a heterogeneous wireless communication system. The ANDSF policy server node 1 is configured to provide policies concerning network discovery and selection of radio access technology and traffic steering of radio bearers for an associated user equipment, wherein the ANDSF policy server node 1 includes a query unit or functional module 11 for receiving queries from a radio access network node 2, which queries including request for information relating to the user equipment associated with the ANDSF policy server 1. In addition, the ANSDF server node 1 includes an identification unit or functional module 12 for receiving a user equipment identity for the associated user equipment. Further, the ANDSF server node 1 includes a core network information unit or functional module 13 for providing core network related information for an identified associated user equipment, and a query response unit/module 14 for generating and transmitting responses to received queries to the radio access network node 2, which response comprises at least the core network related information.

According to a further embodiment, the policy server arrangement or node 1 includes a general input output unit I/O for receiving and transmitting signals in the policy server arrangement 1. Further, the arrangement 1 includes a query unit 11, which is configured for receiving queries from RAN nodes 2 in a heterogeneous wireless communication system. Further, the arrangement 1 includes an ID unit 12 for maintaining and/or providing UE identity and optionally location information relating to user equipment associated with the policy server arrangement 1. In this context the word providing is used to encompass such measures as retrieving the UE ID from a received query, or identifying a queried UE based on some information contained in a memory or register that the ANDSF server node 1 maintains or has access to. In addition, the arrangement 1 includes a core network information unit 13, which is configured for maintaining and providing information relating to the core network. In the same manner as the provision of the UE ID, the word providing can be interpreted as encompassing such solutions as retrieving the queried information from a register maintained in the ANSDF server node, or from some other entity in the system. Finally, the policy server arrangement 1 includes a query response unit 14, which is configured to generate and transmit responses to received queries from RAN nodes 2. In addition, the policy server arrangement 1 includes any elements necessary for performing known measure in a policy server.

In a corresponding manner, the radio access network node needs to be configured to enable the above described exchange of information across the provided interfaces S14'. Accordingly, an embodiment of a radio access network node 2 that is configured to manage network discovery and selection of radio access technology and traffic steering of radio bearers in a heterogeneous wireless communication network will be described. The radio access network node 2 is configured to generate and transmit queries to a ANDSF policy server node 1, which queries concern information related to identified user equipment associated with the ANDSF policy server 1, and to receive query responses from the ANDSF policy server node 1, which query responses include at least core network information for the queried user equipment. Further, the radio access network node 2 is configured to handle received core network information for the identified user equipment, and to optimize the network based on at least radio access network information for the identified user equipment and the provided core network information.

Figure 13:
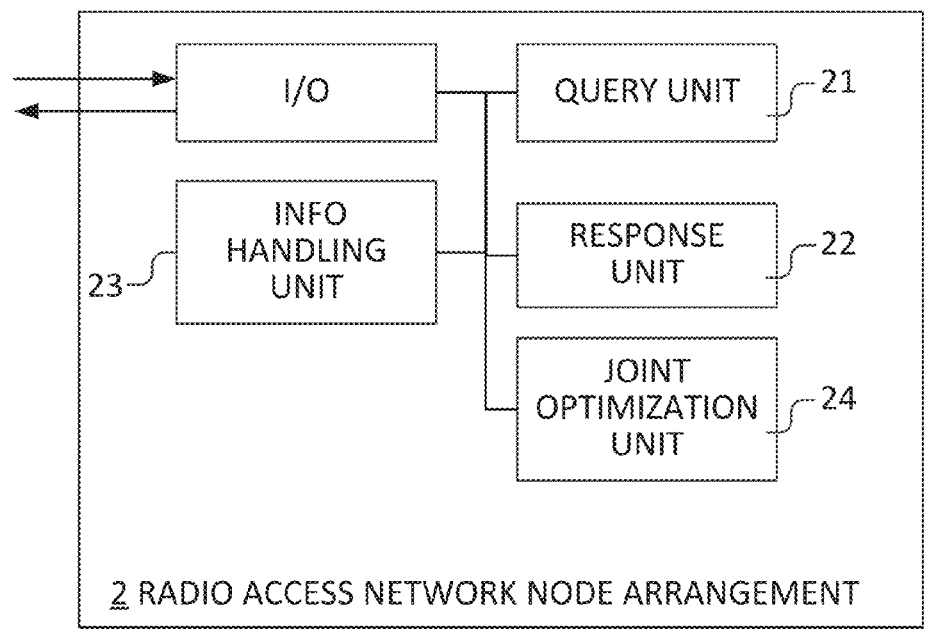
FIG. 13 is a schematic illustration of an embodiment of a radio access network node arrangement according to the current disclosure.

With reference to FIG. 13, an additional embodiment of a radio access network node arrangement 2 will be described. The RAN node arrangement 2 can be included in a RAN node e.g. base station controller node in GERAN, radio network controller node in UTRAN, eNB node in E-UTRAN, AP/AC node in TWAN.

An embodiment of the radio access network node arrangement 2 includes a query unit or functional module 21 for generating and transmitting queries relating to the at least an identified user equipment associated with the ANDSF policy server node 1 to the ANDSF policy server node 1, and a response unit or functional module 22 for receiving query responses from the ANDSF policy server node 1, which query response include at least core network information for the at least identified associated user equipment. Further, the radio access node arrangement 2 includes an information handling unit or functional module 23 for handling the provided at least core network information and a joint optimization unit or functional module 24 for optimizing the network based on at least radio access network information for the identified user equipment and the provided core network information.

In other words, the RAN node arrangement 2 includes a general input output unit I/O for receiving and transmitting signals in the RAN node arrangement 2. Further, the arrangement 2 includes a query unit 21, which is configured for generating and transmitting queries for information relating to identified user equipment associated with a policy node to policy nodes 1 e.g. ANDSF nodes 1 in a heterogeneous wireless communication system. Further, the RAN node arrangement 2 includes a response unit 22 for receiving query responses from policy nodes 1 generated in response to the transmitted query. Further, the RAN node arrangement 2 includes an info handling unit 23 for handling optionally location information as well as provided core network information received in the query response. Finally, the RAN node arrangement 2 includes a unit for joint optimization 24 of the heterogeneous network based on at least RAN information for the identified UE and location in question and core network information. In this sense, the RAN information for the identified UE includes e.g. the radio link quality, and the location information is e.g. the surrounding cells and cell loads. In addition, the RAN node arrangement 2 includes any elements necessary for performing known measure in a RAN node arrangement 2.

According to a further embodiment, the radio access network node is configured to provide location information for the identified user equipment in the query, thereby enabling the ANSDF policy server node 1 to provide additional information related to the user equipment.

In yet another embodiment, the radio access network node is further configured to identify a user equipment, and locate any available ANDSF policy servers with which the identified user equipment is associated. The identifying step can include the radio access network node receiving an indication that a user equipment has entered a predetermined mode such as RRC connected mode in LTE or Associated mode in WLAN or similar. In addition, the locating step can include the radio access network node transmitting a DNS query for available ANDSF policy server nodes.

Figure 14:
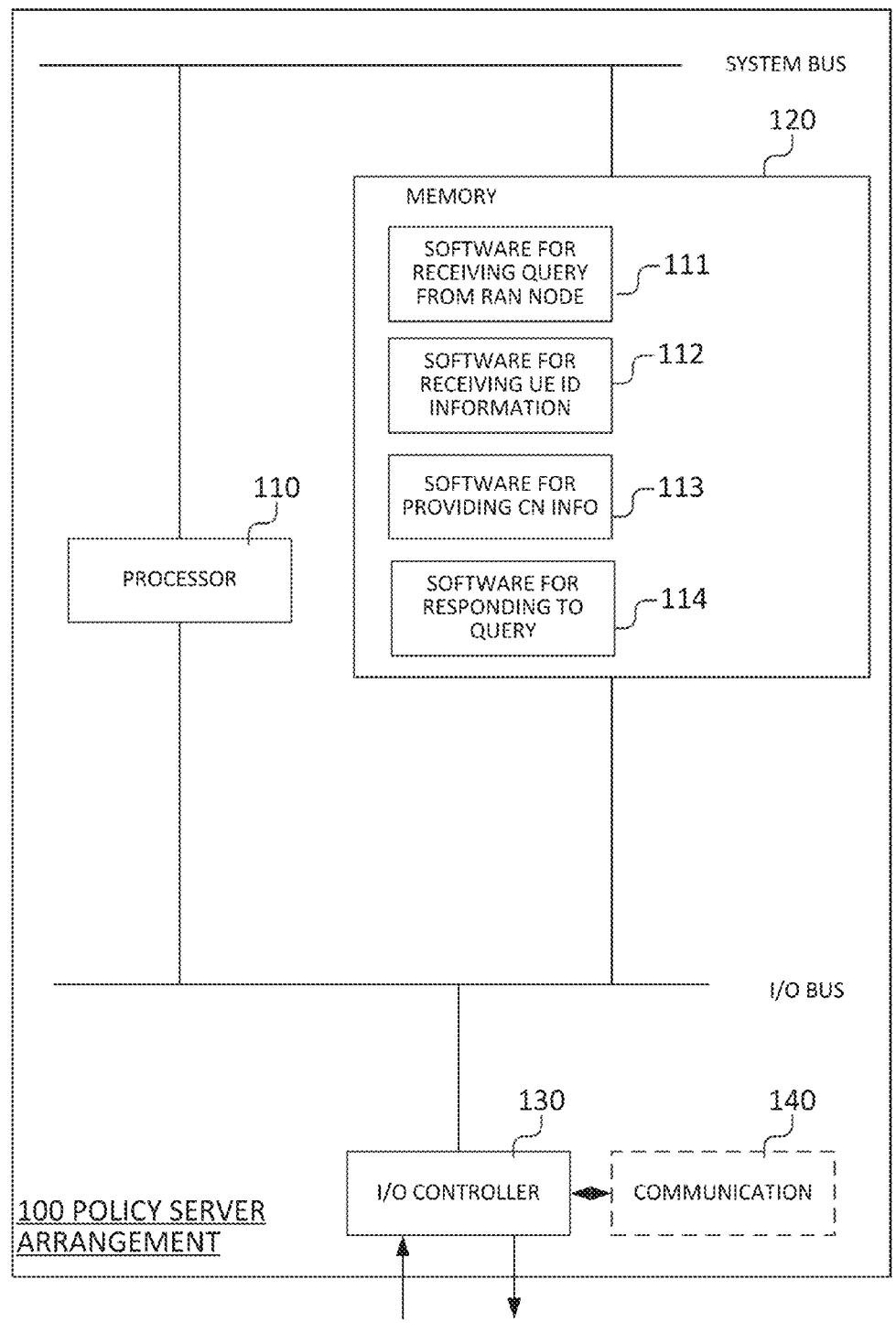
FIG. 14 is a further schematic illustration of an embodiment of a policy server arrangement according to the current disclosure.

FIG. 14 is a schematic block diagram illustrating an example of a policy server node or policy server arrangement 100 according to the current disclosure comprising a processor 110 and an associated memory 120. The memory 120 includes instructions executable by the processor 110, whereby the ANDSF policy server node 1 is operative to receive queries from a radio access network node 2, which queries include request for information relating to a user equipment associated with the ANDSF policy server arrangement, and further operative to receive a user equipment identity for the associated user equipment and to provide core network related information for the user equipment. Finally, the ANDSF policy server node 1 is further operative to generate and transmit responses to the received queries to the radio access node 2, which response includes at least the provided core network related information.

According to a further embodiment, the ANDSF policy server node 1 includes communication circuitry 140 configured to receive queries from a radio access network node 2, the queries relating to an identified user equipment associated with the ANDSF policy server 1, and to receive a user equipment identity for the identified associated user equipment. Further the communication circuitry is configured to enable providing at least core network related information for the identified user equipment, and generate and transmit responses to the received queries to the radio access network node 2, which response includes at least the provided core network related information. This is enabled by passing information between the RAN node and the different software modules running in the memory.

Also, according to a further embodiment, the disclosure provides a computer program comprising instructions which when executed by at least one processor, cause the processor(s) to receive queries from a radio access network node 2, for information relating to an identified user equipment associated with a ANDSF policy server node 1, and to receive a user equipment identity for the identified user equipment. Further the processor provides core network related information for the identified user equipment, and generates and transmits responses to the received queries to the radio access network node 2, which response includes at least the provided core network related information. The computer program can be included in a carrier being one of an electrical signal, an optical signal, an electromagnetic signal, a magnetic signal, an electrical signal, a radio signal, a microwave signal, or a computer-readable storage medium.

In the following, a further example of an embodiment of a policy server arrangement 100 will be described with reference to FIG. 14. This embodiment is based on a processor 110, for example a micro-processor, which executes a software component 111 for receiving queries from radio access network nodes 2, a software component 112 for maintaining and providing user equipment identity information and optionally location information, a software component 113 for maintaining and providing core network information, and a software component 114 for responding to a received query.

These software components are stored in memory 120. The processor 110 communicates with the memory over a system bus. The analog signal is received by an input/output (I/O) controller 130 controlling an I/O bus, to which the processor 110 and the memory 120 are connected. In this embodiment, the signal received by the I/O controller 130 is stored in the memory 120, where it is processed by the software components. Software component 111 may implement the functionality of the receive query step S11 in the embodiment described with reference to FIG. 8 above. Software component 112 may implement the functionality of receiving the user equipment identity optionally location information step S12 in the embodiment described with reference to FIG. 8 above. Software component 113 may implement the functionality of the provide core network information step S13 in the embodiment described with reference to FIG. 8 above. Software component 114 may implement the functionality of the respond to query step S15 in the embodiment described with reference to FIG. 8.

The I/O unit 130 may be interconnected to the processor 110 and/or the memory 120 via an I/O bus to enable input and/or output of relevant data such as input parameter(s) and/or resulting output parameter(s), and additionally be interconnected to the communication circuitry 140.

Figure 15:
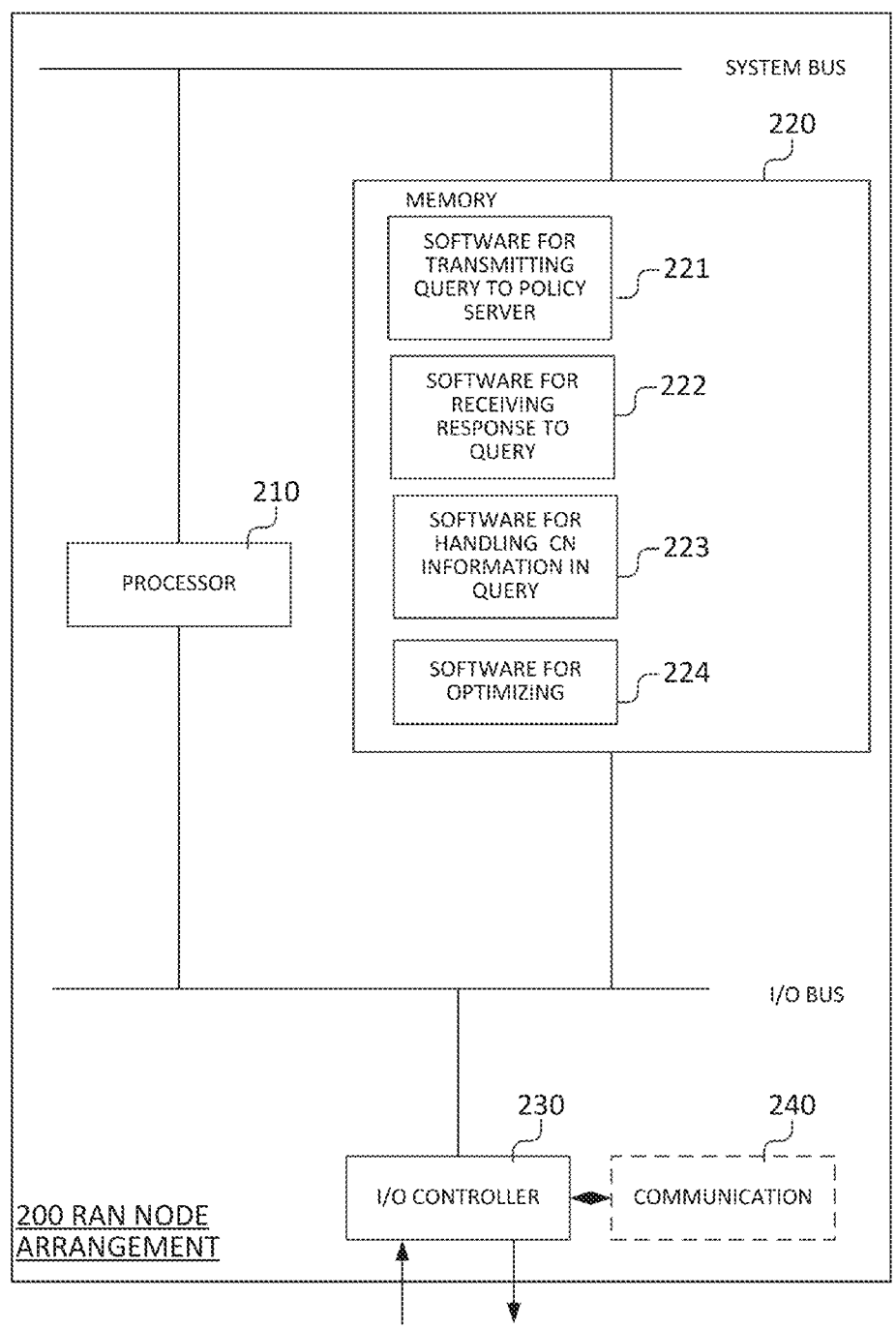
FIG. 15 is a further schematic illustration of an embodiment of a radio access network node arrangement according to the current disclosure.

FIG. 15 is a schematic block diagram illustrating an example of a radio access node or radio access network server arrangement or node 200 according to the current disclosure comprising a processor 210 and an associated memory 220, the memory 220 includes instructions executable by the processor 210, whereby the radio access node 2 is operative to generate and transmit queries for information relating to identified user equipment associated with an ANSDF policy server node 1 to the ANDSF policy server node 1. Further the radio access node 2 is operative to receive query responses from the ANDSF policy server node 1, which responses include at least core network information related to the identified user equipment, and to handle at least the provided core network information related to the identified user equipment, and optimize the network based on at least radio access network information for the identified user equipment and the provided core network information.

According to a further embodiment the radio access network node 2 includes communication circuitry 240 configured to generate and transmit queries for information related to an identified user equipment associated with a ANDSF policy server node 1 to the ANDSF policy server node 1, and to receive query responses from the ANDSF policy server node 1, which query responses include at least core network information for the identified user equipment. Further the communication circuitry is configured to enabling handling at least the core network information, and to optimize the network based on at least radio access network information for the identified user equipment and the provided core network information. This is enabled by passing information between the ANDSF policy server node 1 and the different software modules running in the memory.

In the following, a further example of an embodiment of a radio access network server arrangement 200 will be described with reference to FIG. 15. This embodiment is based on a processor 210, for example a micro processor, which executes a software component 221 for transmitting queries to policy server nodes 1, a software component 222 for receiving responses to transmitted queries from a policy server node 1, a software component 223 for handling core network information in the received query response, and a software component 224 for optimizing the operation of the heterogeneous wireless communication network based on at least received RAN information for the identified UE and location in question and core network information. In this sense, the RAN information for the UE includes e.g. the radio link quality, and the location information is e.g. the surrounding cells and cell loads.

These software components are stored in memory 220. The processor 210 communicates with the memory 220 over a system bus. The analog signal is received by an input/output (I/O) controller 230 controlling an I/O bus, to which the processor 210 and the memory 220 are connected. In this embodiment, the signal received by the I/O controller 230 is stored in the memory 220, where it is processed by the software components. Software component 221 may implement the functionality of the query step S21 in the embodiment described with reference to FIG. 9 above. Software component 222 may implement the functionality of the receive query response step S22 in the embodiment described with reference to FIG. 9 above. Software component 223 may implement the functionality of the handle user equipment identity and optionally location information and core network information step S23 in the embodiment described with reference to FIG. 9 above. Software component 224 may implement the functionality of the joint optimization step S24 in the embodiment described with reference to FIG. 9.

The I/O unit 230 may be interconnected to the processor 210 and/or the memory 220 via an I/O bus to enable input and/or output of relevant data such as input parameter(s) and/or resulting output parameter(s), and to the communication circuitry 240.

According to further embodiments, the current technology includes a computer program comprising instructions, which when executed by at least one processor, cause the processor(s) to generate and transmit queries for information related to identified user equipment associated with a ANDSF policy server node to the ANDSF policy server node 1, and to receive query responses from the ANDSF policy server node 1, which query responses comprising at least core network information for the identified user equipment. Further the computer program includes instructions causing the processor to handle queried core network information and optimize the network based on at least radio access network information for the identified user equipment and the provided core network information. The computer program can be carried by a carrier which is one of an electrical signal, an optical signal, an electromagnetic signal, a magnetic signal, an electrical signal, a radio signal, a microwave signal, or a computer-readable storage medium.

As mentioned above, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

The software may be realized as a computer program product according to the above, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

In a particular example, the apparatus comprises a processor and a memory, said memory comprising instructions executable by the processor, whereby the apparatus/processor is operative to [repeat the above to functions, steps, actions].

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Blueray disc, a Universal Serial Bus, USB, memory, a Hard Disk Drive, HDD storage device, a flash memory, a magnetic tape, or any other conventional memory device. The computer program may thus be loaded into the operating memory of a computer or equivalent processing device for execution by the processing circuitry thereof.

As indicated herein, the policy server arrangement 1 and the radio access network node arrangement may alternatively be defined as a group of function modules, where the function modules are implemented as a computer program running on at least one processor. The functional modules can be viewed as corresponding to the units described with reference to FIG. 12 and FIG. 14.

The computer program residing in memory may thus be organized as appropriate function modules configured to perform, when executed by the processor, at least part of the steps and/or tasks described herein. An example of such function modules is illustrated in FIG. 13 and FIG. 15.

By implementing the novel interface S14' according to the present disclosure, not only the UE is capable to query a policy server 1 for information pertaining to the core network, but also the RAN nodes 2 can query the same policy server. Thus, it is possible to move the control of the mobility behavior of the user equipment, when moving or relocating between the cellular network and the wireless local area network, further up in the network, which in turn enables a more centralized and joint optimization of the resource utilization in heterogeneous wireless communication networks and in particular for 3GPP and WLAN. Finally, by means of the embodiments of the present disclosure there is no or less need to update Core Network nodes to enable RAN control for 3GPP-WLAN integration.

The above described methods are mainly based on the RAN node providing the current UE location to the ANDSF server. In addition, the policies provided from the ANDSF server to the RAN node may be for the current location of the UE, and/or these policies may also include information about policies for other locations than the current UE location.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method of exchanging information between an Access Network Discovery and Selection Function (ANDSF) policy server node and a radio access network node in a heterogeneous wireless communication network, said method being performed by the ANDSF policy server node and comprising:

receiving a query, from said radio access network node, for information related to an identified user equipment associated with said ANDSF policy server node, over a provided direct communication interface between the ANDSF policy server node and the radio access network node;

providing at least core network information related to said identified user equipment in response to said query, the core network information including:

subscription information for the identified user equipment, the subscription information including allowed Radio Access Technologies (RATs), and identifiers of allowed Public Land Mobile Networks (PLMNs); and responding to said query by providing the queried information to said radio access network node over said provided direct communication interface to enable the radio access network node to perform RAT and bearer selection for the user equipment.

2. The method according to claim 1, wherein said query includes location information for said identified user equipment.

3. An Access Network Discovery and Selection Function (ANDSF) policy server node comprising:
a processor; and
a memory, said memory storing instructions executable by the processor, whereby the ANDSF policy server node is operative to:
receive queries from a radio access network node over a provided direct communication interface between the ANDSF policy server node and the radio access network node, said queries relating to a user equipment associated with said ANDSF policy server node;
receive a user equipment identity for said associated user equipment;
provide core network related information related to the user equipment, the core network related information including:
subscription information for the user equipment, the subscription information including allowed Radio Access Technologies (RATs), and
identifiers of allowed Public Land Mobile Networks (PLMNs); and
generate and transmit responses to said received queries to said radio access node over the provided direct communication interface, said response comprising at least said core network related information to enable the radio access network node to perform RAT and bearer selection for the user equipment.

4. The method according to claim 3, wherein said queries include location information for the user equipment.

5. A non-transitory computer readable medium comprising instructions which, when executed by at least one processor, cause the at least one processor of an Access Network Discovery and Selection Function (ANDSF) policy server node to:
receive queries from a radio access network node over a provided direct communication interface between the ANDSF policy server node and the radio access network node, for information relating to an identified user equipment associated with the ANDSF policy server node;
receive a user equipment identity for said identified user equipment;
provide core network related information for said identified user equipment, the core network related information including:
subscription information for the user equipment, the subscription information including allowed Radio Access Technologies (RATs), and
identifiers of allowed Public Land Mobile Networks (PLMNs); and
generate and transmit responses to said received queries to said radio access network node over the provided direct communication interface, said responses comprising at least said core network related information to enable the radio access network node to perform RAT and bearer selection for the user equipment.

6. A method of controlling operation of a heterogeneous wireless communication network, said network comprising at least one Access Network Discovery and Selection Function (ANDSF) policy server node, at least one user equipment associated with said ANDSF policy server node, and at least one radio access network node, said method being performed by the radio access network node and comprising:
transmitting a query to the ANDSF policy server node, over a provided direct communication interface between the ANDSF policy server node and the radio access network node, for information relating to an identified user equipment associated with said ANDSF policy server node;
receiving a query response, over said provided direct interface from said ANDSF policy server node, said query response comprising at least core network information related to said identified user equipment, the core network related information including:
subscription information for the user equipment, the subscription information including allowed Radio Access Technologies (RATs), and
identifiers of allowed Public Land Mobile Networks (PLMNs);
handling said core network information for said identified user equipment; and
optimizing operation of the heterogeneous wireless communication network based on said received and handled information.

7. The method according to claim 6, wherein said query includes location information for said user equipment.

8. The method according to claim 6, further comprising the additional steps of:
identifying a user equipment; and
locating any available ANDSF policy servers with which the identified user equipment is associated.

9. The method according to claim 8, wherein said identifying step includes receiving by the radio access network node, an indication that a user equipment has entered a predetermined mode.

10. The method according to claim 8, wherein said locating step includes transmitting a Domain Name System (DNS) query for available ANDSF policy server nodes to a DNS server.

11. A radio access network node in a heterogeneous wireless communication network, said radio access network node comprising:
a processor; and
a memory, said memory comprising instructions executable by the processor, whereby the radio access node is operative to:
generate and transmit queries for information relating to identified user equipment associated with an Access Network Discovery and Selection Function (ANDSF) policy server node to said ANDSF policy server node over a provided direct communication interface between the ANDSF policy server node and the radio access network node;
receive query responses from said ANDSF policy server node over said provided direct interface, said responses comprising at least core network information related to said identified user equipment, the core network related information including:

subscription information for the user equipment, the subscription information including allowed Radio Access Technologies (RATs), and identifiers of allowed Public Land Mobile Networks (PLMNs);

handle at least said core network information related to said identified user equipment; and optimize the heterogeneous wireless communication network based on at least radio access network information for said identified user equipment and the core network information received from the ANDSF policy server node.

12. The radio access network node according to claim 11, wherein said radio access network node is further configured to provide location information for said identified user equipment in said queries.

13. The radio access network node according to claim 11, wherein said radio access network node is further configured to:

identify a user equipment, and locate any available ANDSF policy servers with which the identified user equipment is associated.

14. The radio access network node according to claim 13, wherein said radio access network node is further configured to identify the user equipment by receiving an indication that the user equipment has entered a predetermined mode.

15. The radio access network node according to claim 13, wherein said radio access network node is further configured to locate any available ANDSF policy servers by transmitting a DNS Domain Name System (DNS) query for available ANDSF policy server nodes.

* * * * *